United States Patent [19]
Rosenberg et al.

[11] Patent Number: 5,461,354
[45] Date of Patent: Oct. 24, 1995

[54] MAGNETIC SPHERE FOR USE IN A PIPELINE

[75] Inventors: Jeffrey Rosenberg; Steve Worthen, both of Tulsa, Okla.

[73] Assignee: TDW Delaware, Inc., Wilmington, Del.

[21] Appl. No.: 275,625

[22] Filed: Jul. 14, 1994

[51] Int. Cl.⁶ .................. B08B 9/02; H02F 7/02
[52] U.S. Cl. ............ 335/306; 335/303; 15/104.061
[58] Field of Search .................. 335/302–306, 335/219; 40/426, 449; 340/815.62, 815.71; 15/104.03–104.33; 315/111.41–111.71; 376/121–143

[56] References Cited

U.S. PATENT DOCUMENTS

| | | | |
|---|---|---|---|
| 1,589,039 | 6/1926 | Anschutz-Kaempfe | 74/5.46 |
| 3,546,642 | 12/1970 | Frederick et al. | 335/305 |
| 3,673,692 | 7/1972 | Quenot | 33/118 |
| 4,113,611 | 9/1978 | Gohm | 209/215 |
| 4,441,375 | 4/1984 | Minohara | 74/5.46 |
| 4,654,561 | 3/1987 | Shelton | 315/111.7 |
| 4,945,306 | 7/1990 | Lowther | 324/220 |
| 5,323,442 | 6/1994 | Golovanivsky et al. | 378/119 |
| 5,379,271 | 1/1995 | Moedt | 368/24 |

FOREIGN PATENT DOCUMENTS

3122643A1  1/1983  Germany.

Primary Examiner—Picard Leo P.
Assistant Examiner—Raymond M. Barrera
Attorney, Agent, or Firm—Head & Johnson

[57] ABSTRACT

A spherical pigging device for passage through a pipeline wherein magnetic sensors are located exterior to the pipeline. The device includes a non-ferrous spherical body. A plurality of magnets, each magnet having its poles radially aligned, are divided into two groups, a first group having its north poles facing the center of the spherical body and a second group having its north poles facing away from the center of the sphere.

4 Claims, 3 Drawing Sheets

MAGNETIC SPHERE FOR USE IN A PIPELINE

BACKGROUND OF THE INVENTION

1. Field of the Invention

The present invention relates to a spherical pigging device for passage through a pipeline which may be detected by magnetic sensors located external to the pipeline.

2. Prior Art

Pipeline "pigging" devices are used for cleaning, testing, gauging or operating a pipeline and are adapted to fit in sealable engagement with the interior of the pipeline. The pigging device may be moved through the pipeline in a number of ways. One way is to pressurize the pipeline with fluid behind the device to move it through the pipeline.

The need to detect passage of solid objects such as pigging devices moving through pipelines has been served by a number of instruments. A detection mechanism or signalling device senses movement of protrusions through the pipeline. One type of sensing device is physically attached to the pipeline through an opening and functions throughout the life of the pipeline. Usage may vary from every few hours to every few years. Periodic maintenance is required which requires special equipment operated by trained personnel that is performed on operating pipeline. If the signalling device is not maintained, it may leak the pipeline contents into the environment and impair the operability of the signalling device.

To alleviate the need for an opening to be cut into the pipeline and frequent maintenance, several types of non-intrusive signalling devices have been developed. One type of non-intrusive signalling device sends ultrasonic signals through the pipeline wall to sense the location of the pig. The ultrasonic devices are relatively expensive, require tight physical attachment to the pipe wall and have to be tuned with relation to the substance inside the pipeline.

Another type of non-intrusive signalling device senses the magnetic field change when a pig containing a magnet passes the signalling location. The pipeline wall is magnetically saturated with the magnetic field extending well outside the wall. A number of different devices of magnetic non-intrusive signalling devices have been produced. The magnetic non-intrusive signalling device is typically inexpensive, is easily mounted to the pipeline, is relatively small and is easily transportable. Additionally, the magnetic type of non-intrusive signalling device is relatively unaffected by the substance within the pipeline. The magnetic signalling device must, however, be used with a pig that has magnets on the pig.

The majority of pipeline pigs are composed of a number of cups forming a tubular body or a number of disks connected to a tubular body. A bar magnet is typically added to the tubular body with the poles of the magnet displaced axially along the axis of the pig body. The pole orientation of the magnet with respect to the axis of the pipeline is, therefore, maintained by the cups or the disks of the pig.

Another type of pipeline pig is a sphere which may be inflatable. Spherical pigs used in pipelines have a number of advantages. First, they are relatively easy to launch and receive. Second, the spherical pigs will even travel well during bends in the pipeline. Third, spherical pigs can be inflated to compensate for wear which occurs over time.

At the same time, however, a spherical pig is not restrained from rolling or rotating and moving in the pipeline. Accordingly, the magnetic field of the simple bar magnet may not reach the signalling device. Additionally, the magnetic pole orientation, with respect to the pipeline of a bar magnet added to the sphere, would not be constant or controllable once moving in the pipeline.

In addition to the proposal for the use of a single magnet on a sphere, plural magnets on a sphere have also been proposed. An example is shown in U.S. Pat. No. 3,546,642 (Frederick et al.), wherein a plurality of magnets are disposed on a magnetic sphere. Each of the magnets is an independent weak magnet having an independent magnetic field. No provision is made for coordinating the orientation of the magnetic fields.

There is a need, therefore, for a spherical pigging device having a plurality of magnets wherein the magnetic fields of the magnets are coordinated.

There is also a need to provide a process to produce a spherical pigging device wherein the magnets are embedded within the hollow body of the device and not subject to wear or breakage.

SUMMARY OF THE INVENTION

The present invention provides a spherical pigging device for passage through a pipeline.

The pigging device includes a non-ferrous spherical body wherein the exterior circumference of the body mates with and engages with the inside wall of the pipeline.

The spherical body is composed of an elastomeric material that is non-ferrous. The spherical body is hollow having an interior circumference that may be inflated with a fluid during usage in the pipeline.

The pigging device includes a series of six permanent magnets. Each magnet is radially equidistant from the center of the spherical body. Each magnet is equidistant from each adjacent magnet. Each magnet is spaced from the exterior circumference of the spherical body so that it will not engage with or be in contact with the pipeline. Each magnet is additionally spaced from the interior circumference by a spacer.

Each of the six magnets is aligned with the radius of the spherical pigging device. Pairs of magnets are aligned through the diameter of the device and have their poles aligned in the same orientation.

The magnets may be divided into two groups, a first group of three magnets which have their north poles facing the center of the spherical body and a second group of magnets which have their north poles facing away from the center of the spherical body. The first group of magnets is in one hemisphere while the second group of magnets is in the other hemisphere. While each magnet has its own magnetic field, the combined effect of the individual magnetic fields makes the spherical pigging device have a combined, total magnetic field similar to a bar magnet with a north pole/south pole orientation.

DETAILED DESCRIPTION OF THE PREFERRED EMBODIMENT

Figure 1:
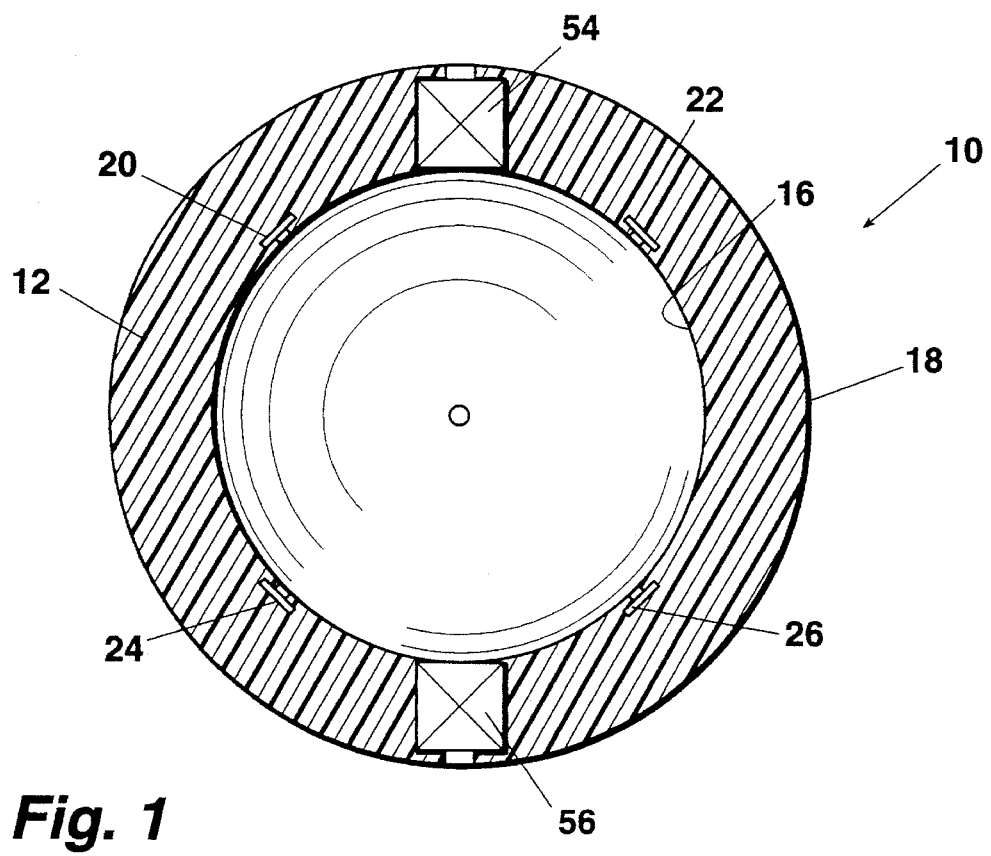
FIG. 1 is a sectional view of the spherical pigging device constructed in accordance with the present invention.

Referring to the drawings in detail, FIG. 1 illustrates a sectional view of a spherical pigging device 10 for passage through a pipeline (not shown). The pigging device 10 has been sectioned through a diameter thereof. The size of the pigging device will vary with the pipeline to be used; it has been found that the present invention is applicable to all sizes of spheres.

The pigging device 10 includes a non-ferrous spherical body 12. The exterior circumference 18 of the spherical body 12 will mate with and engage with the inside wall of the pipeline (not shown). Through usage, the exterior circumference 18 will wear under contact with the pipeline. The pigging device may be inflated to the appropriate size to compensate for wear.

As will be described herein, the spherical body 12 will be composed of an elastomeric material such as urethane which is somewhat pliable. Other material may be used, although it is preferable that the spherical body be non-ferrous, so that the body itself does not create or interfere with a magnetic field.

It will be observed that the spherical body 12 is hollow having an interior circumference 16. During use of the pigging device, the spherical body may be inflated with a fluid such as water (not shown).

The pigging device 10 includes a series of permanent magnets. In the present embodiment, six permanent magnets are employed. Four magnets are visible in FIG. 1—magnets 20, 22, 24, and 26—which are each radially equidistant from the center of the spherical body 12. Each magnet is also equidistant from each adjacent magnet. Each magnet is spaced from the exterior circumference of the spherical body 12 so that it will not engage with or be in contact with the interior of the pipeline. Accordingly, the magnets are protected from wear.

Figure 2:
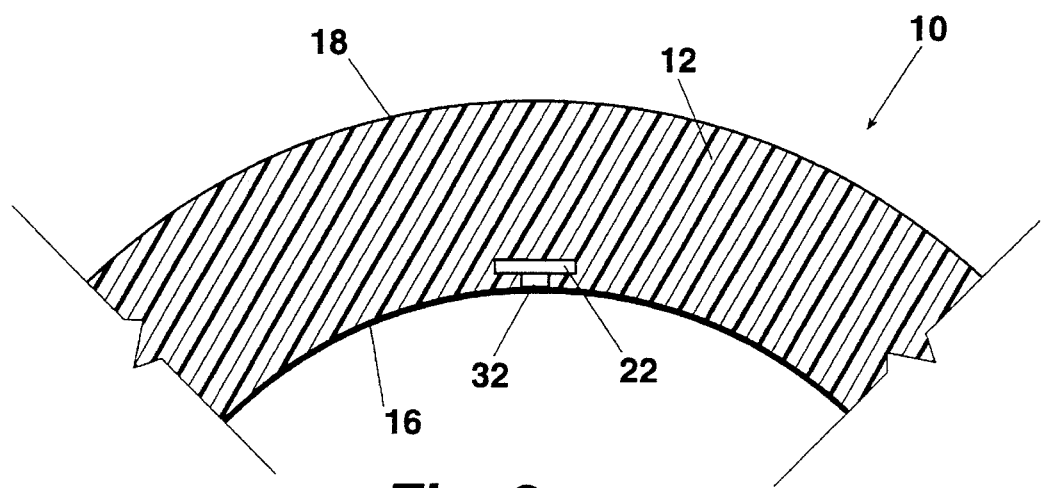
FIG. 2 is an enlarged view of a portion of the spherical body of the spherical pigging device shown in FIG. 1.

FIG. 2 shows an enlarged view of a portion of the spherical body 12 of the pigging device 10. One of the magnets 22 is visible within the interior of the spherical body 12. The magnet 22 is spaced from the interior circumference 16 by a spacer 32. Accordingly, the magnet is not subject to wear or damage.

Figure 3:
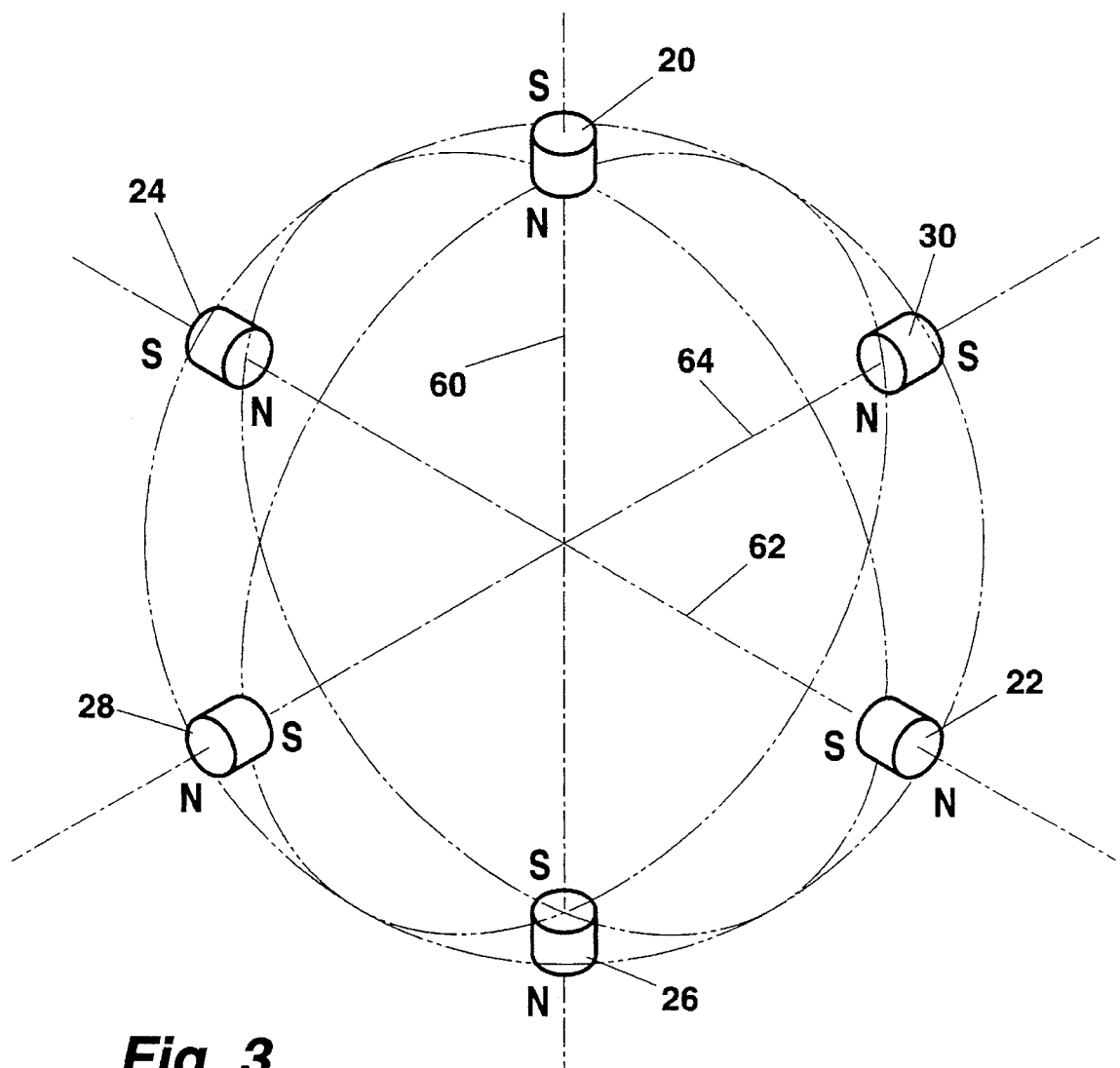
FIG. 3 is a diagrammatic representation of the arrangement of magnets apart from the spherical pigging device itself.

FIG. 3 is a diagrammatic representation of the arrangement of the six magnets apart from the spherical pigging device 10.

Each magnet 20, 22, 24, 26, 28, and 30 is aligned with the radius of the spherical pigging device. Magnets 20 and 26 are aligned through the diameter 60 of the device and have their poles aligned in the same orientation. Magnets 22 and 24 are aligned through the diameter 62 of the device and have their poles aligned in the same orientation. Likewise, magnets 28 and 30 are aligned through the diameter 64 of the device and have their poles aligned in the same orientation.

It will be observed that the magnets may be divided into two groups, a first group of magnets 20, 24, and 30 which have their north poles facing the center of the spherical body and a second group of magnets 22, 26, and 28 each have their north poles facing away from the center. The first group of magnets is in one hemisphere while the second group of magnets is in the other hemisphere. While each magnet has its own magnetic field, the combined effect of the magnetic fields makes the spherical pigging device have a combined, total magnetic field similar to a bar magnet with a north pole/south pole orientation.

Figure 6:
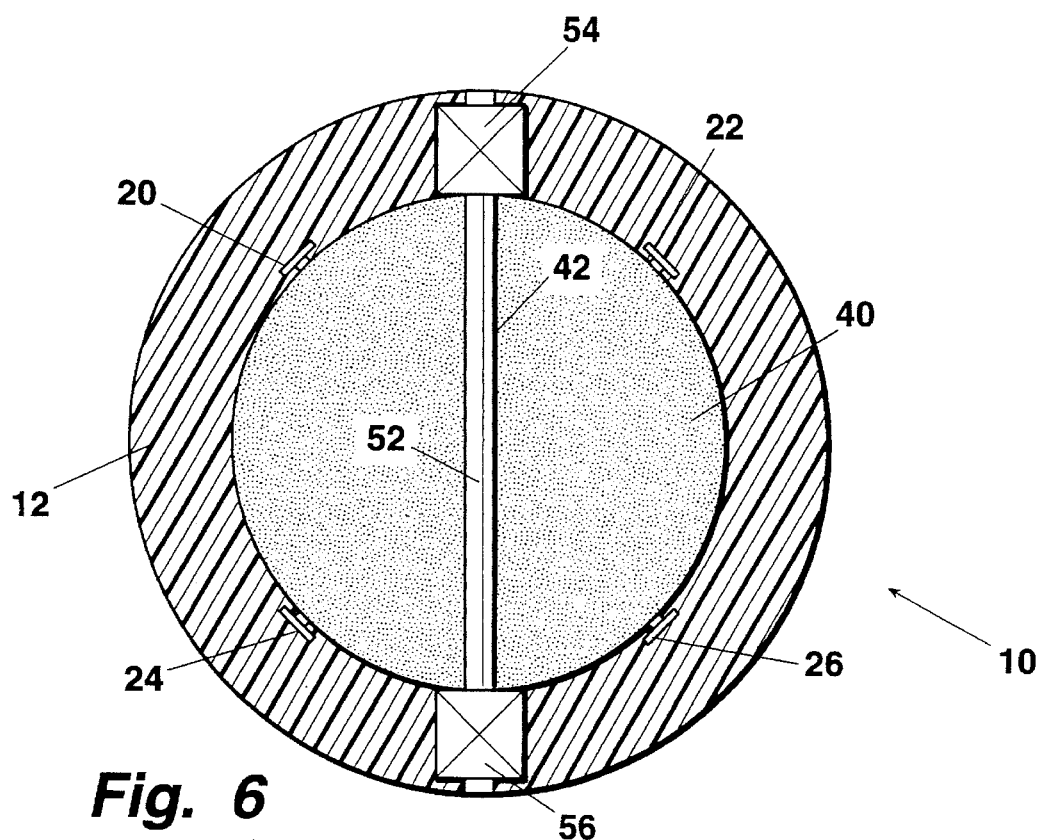
FIGS. 4, 5, and 6 illustrate the sequential steps to produce a spherical pigging device in accordance with the present invention.
Figure 4:
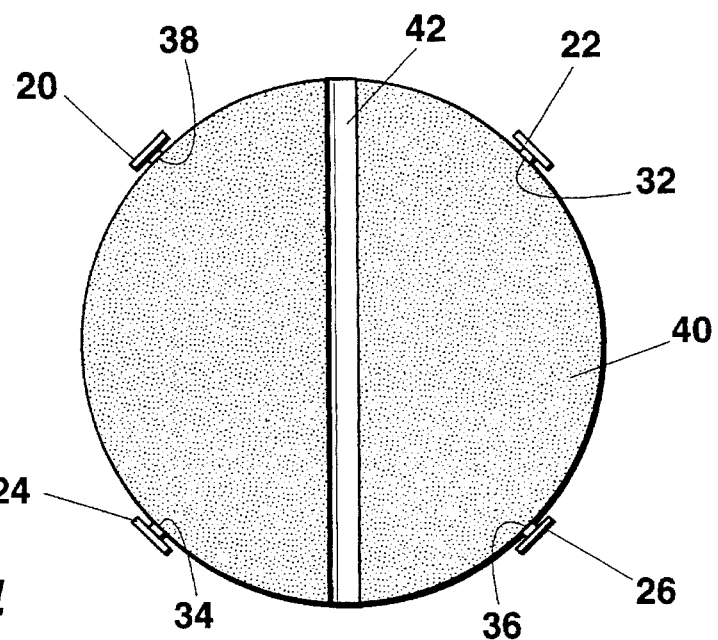
Figure 5:
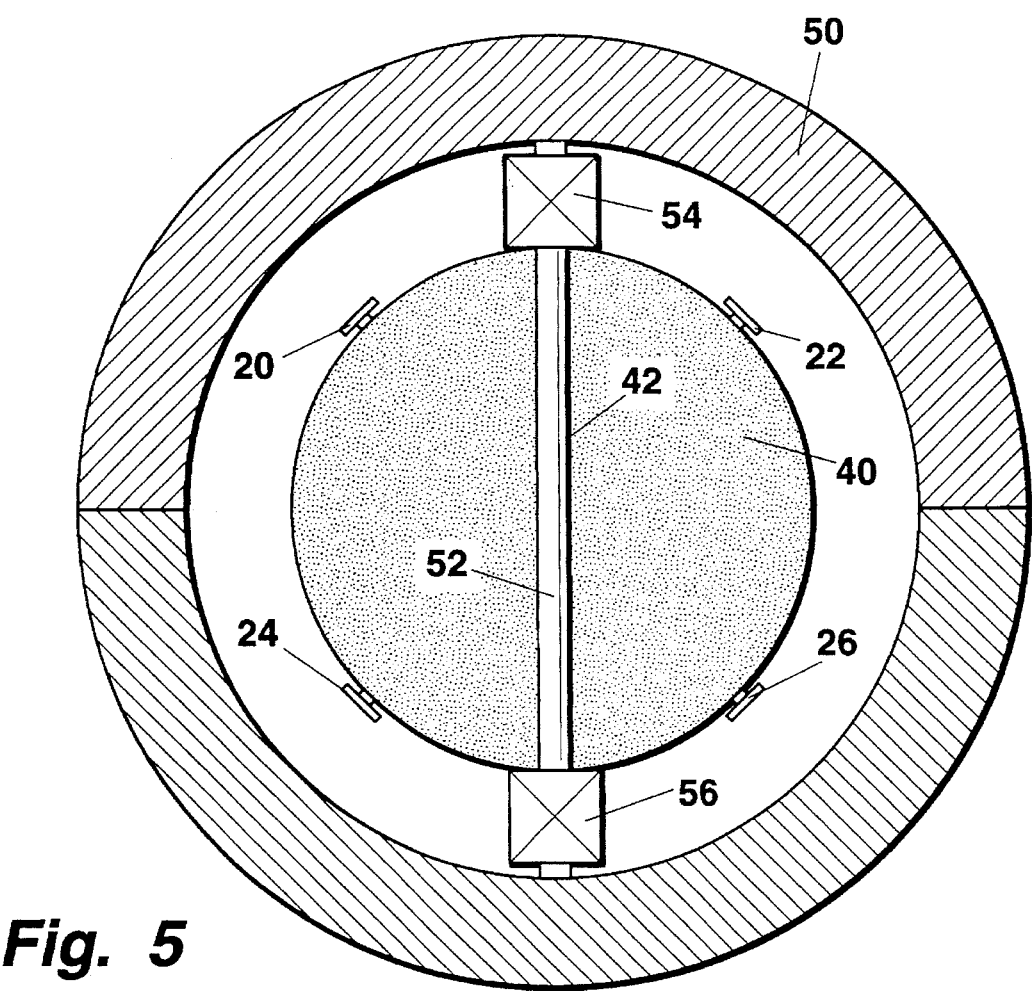

FIGS. 4, 5, and 6 illustrate the sequential steps required to produce a spherical pigging device 10 in accordance with the present invention. In order to produce the pigging device 10, initially a spherical core 40 is produced. The core 40 is produced from a material that is liquid when heated and solidifies or cures when cooled. One such material is manufactured under the tradename PARAPLAST which is also capable of dissolving in water.

The spherical core 40 may be cast with a hole or opening 42 through the diameter of the core. The six magnets (20, 22, 24 and 26 are visible in FIG. 4) are glued or otherwise affixed to the exterior of the core 40 while it is still curing. Six spacers (32, 34, 36 and 38 are visible in FIG. 4) are glued or otherwise affixed under the magnets so that each magnet is spaced from the circumferential surface of the core 40. As will be seen herein, this assures that the magnet is ultimately surrounded or embedded within the spherical body 12 upon completion.

The next step is seen in FIG. 5. The core 40 is thereafter suspended within a hollow spherical mold 50. The core 40 is concentrically aligned with the spherical mold 50. This may be accomplished through use of a rod 52 which extends through the opening 42 in the core and engages the mold. At each end of the rod 52, between the spherical mold and the core, valves 54 and 56 are installed.

A spherical space is thus produced between the core and the spherical mold. Thereafter, urethane is poured into the mold in a liquid state. The mold with core may be rotated which tends to force any air bubbles outward. In a preferred process, the urethane is cured in an oven for a period of time at approximately 200° F.

FIG. 6 illustrates the next step in the process to produce the spherical pigging device 10. The spherical mold 50 is removed so that the solidified spherical body 12 is revealed. The magnets (20, 22, 24, and 26 are visible) are embedded within the spherical body.

As seen in FIG. 6, the core 40 is still within the spherical body. The core is cracked in a number of places by dropping the spherical body 12 onto the ground. The resulting cracks will allow water to dissolve the core 40 faster. The rod is removed and a water hose (not shown) is connected to one of the valves while the other valve is forced open. Water entering the core will cause the core 40 to dissolve. The resulting mixture will be flushed out of the opposite valve so that the body is hollow.

Thereafter, the completed valve is illustrated in FIG. 1. The spherical body 12 may be inflated as a test to make sure that it adequately holds pressure. The pigging device may be shipped deflated with the core hollow. When the pigging device is used in the field in a pipeline, it will be filled with water and pumped up to the correct size for the interior diameter of the pipeline.

Whereas, the present invention has been described in relation to the drawings attached hereto, it should be understood that other and further modifications, apart from those shown or suggested herein, may be made within the spirit and scope of this invention.

What is claimed is:

1. A pig for passage through a pipeline where at least one magnetic sensor is located, comprising:

an elastomeric spherical body having an exterior spherical surface and having a first and a second hemispherical portion; and a plurality of permanent magnets positioned within said spherical body in spaced apart locations and spaced from said spherical surface, each magnet having a north and a south pole, the magnets being divided into a first group located within said body first hemispherical portion and a second group located within said body second hemispherical portion, said magnets in said first group each having said north pole facing towards said body spherical surface and said magnets in said second group each having said south pole facing towards said body spherical surface.

2. A pig for passage through a pipeline according to claim 1 wherein said elastomeric spherical body is hollow.

3. A pig for passage through a pipeline according to claim 2 including at least one valve by which fluid may be injected into or removed from said hollow spherical body.

4. A pig for passage through a pipeline according to claim 2 wherein said hollow spherical body provides an interior spherical surface and wherein said magnets are adjacent to said interior spherical surface.

* * * * *